United States Patent
Deshmukh (10) Patent No.: US 11,083,027 B2
(45) Date of Patent: Aug. 3, 2021

(54) POINT TO POINT COMMUNICATION WITH LOW-POWER DEVICE

(71) Applicant: Landis+Gyr Innovations, Inc., Alpharetta, GA (US)

(72) Inventor: Pushpesh Kumar Deshmukh, Alpharetta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/832,384

(22) Filed: Mar. 27, 2020

(65) Prior Publication Data

US 2020/0314923 A1 Oct. 1, 2020

Related U.S. Application Data

(60) Provisional application No. 62/826,370, filed on Mar. 29, 2019.

(51) Int. Cl.
| | |
|---|---|
| *H04W 76/10* | (2018.01) |
| *H04B 1/7156* | (2011.01) |
| *H04W 12/06* | (2021.01) |
| *H04W 52/02* | (2009.01) |

(52) U.S. Cl.
CPC .......... *H04W 76/10* (2018.02); *H04B 1/7156* (2013.01); *H04W 12/06* (2013.01); *H04W 52/0235* (2013.01)

(58) Field of Classification Search
CPC . H04W 76/10; H04W 12/06; H04W 52/0235; H04W 4/80; H04W 4/00; H04W 52/0229; H04B 1/7156; H04Q 2209/883; H04Q 2209/60; H04Q 2209/25; H04Q 9/00; H04Q 2209/86; Y02D 30/70
See application file for complete search history.

(56) References Cited

U.S. PATENT DOCUMENTS

2008/0219210 A1 9/2008 Shuey et al.
2019/0341954 A1* 11/2019 Zalewski ................ H04L 67/10

FOREIGN PATENT DOCUMENTS

KR 20130063866 6/2013

OTHER PUBLICATIONS

International Patent Application No. PCT/US2020/025213, International Search Report and Written Opinion dated Jul. 27, 2020, 10 pages.

* cited by examiner

*Primary Examiner* — Diane D Mizrahi
(74) *Attorney, Agent, or Firm* — Kilpatrick Townsend & Stockton LLP (57) ABSTRACT

Described is a communication link establishment method. The method includes transmitting, by a diagnostic tool, a wireless wake signal on a wake wireless channel to a low-power endpoint in a metrology mesh network. The wake wireless channel is selected using a unique identifier of the battery-operated endpoint. The method also includes receiving, at the diagnostic tool, a confirmation message from the low-power endpoint that the wireless wake signal was received at the low-power endpoint. Additionally, the method includes establishing, by the diagnostic tool, a communication link between the diagnostic tool and the low-power endpoint at a wireless communication channel different from the wake wireless channel. Further, the method includes performing, by the diagnostic tool, a diagnostic operation on the low-power endpoint.

20 Claims, 5 Drawing Sheets

POINT TO POINT COMMUNICATION WITH LOW-POWER DEVICE

CROSS-REFERENCE TO RELATED APPLICATION

This application claims benefit of and priority to U.S. Provisional Application Ser. No. 62/826,370, filed Mar. 29, 2019, and titled "POINT TO POINT COMMUNICATION WITH LOW-POWER DEVICE," the entire contents of which are hereby incorporated by this reference.

TECHNICAL FIELD

Examples of the presently disclosed subject matter relate to communication between devices. In particular, the presently disclosed subject matter relates to communication between a diagnostic tool and a low-power or battery-powered device.

BACKGROUND

Advanced metering infrastructure (AMI) technology is transitioning metering infrastructure to a system of smart communication devices and techniques. Low-power or battery-operated endpoints within an AMI are designed to operate for multiple decades prior to a battery change. Operational restrictions are inherent on the low-power or battery-operated endpoints due to limited power available for the low-power or battery-operated endpoints while maintaining an extended life of the battery. For example, the low-power or battery-operated endpoints may communicate periodically with a fully functional parent endpoint. When the low-power or battery-operated endpoints are not communicating with the parent electric endpoints, the low-power or battery-operated endpoints may operate in a sleep mode to limit power consumption.

To wake the low-power or battery-operated endpoints (e.g., to perform diagnostic operations or other communication operations outside of normal operational parameters of the endpoint), a magnet busting technique may be performed. The magnet busting technique involves waking a low-power or battery-operated endpoint from a sleep mode. Waking the low-power or battery-operated endpoint using the magnet busting technique results in increased power consumption compared to power consumption experienced during normal operation of the low-power or battery-operated endpoint. Further, the magnet busting technique requires a technician to perform diagnostic operations in close physical proximity to the low-power or battery-operated endpoints. In an example, the low-power or battery-operated endpoints can be located multiple feet underground or within a basement of a building. In such an example, the technician must position a magnet near magnet receptors of the low-power or battery-operated endpoints at a location underground, which may require digging, or within the basement of the building, which may disrupt occupants of the building, to control the low-power or battery-operated endpoints to an operational mode from a sleep mode.

SUMMARY

Systems and methods for providing point to point communication with a low-powered device are provided.

According to various aspects of the present disclosure, a communication link establishment method is provided. The method includes transmitting, by a diagnostic tool, a wireless wake signal on a wake wireless channel to a low-power endpoint in a metrology mesh network. The wake wireless channel is selected using a unique identifier of the battery-operated endpoint. The method also includes receiving, at the diagnostic tool, a confirmation message from the low-power endpoint that the wireless wake signal was received at the low-power endpoint. Additionally, the method includes establishing, by the diagnostic tool, a communication link between the diagnostic tool and the low-power endpoint at a wireless communication channel different from the wake wireless channel. Further, the method includes performing, by the diagnostic tool, a diagnostic operation on the low-power endpoint.

In an additional example, a node of a networked system includes a processor that executes computer-readable instructions and a memory that stores the computer-readable instructions that, when executed by the processor, cause the processor to perform operations. The operations include entering a sleep mode and entering a wake mode to listen for a wake signal from a diagnostic tool. The operations also include, while in the wake mode, receiving the wake signal from the diagnostic tool on a wake wireless channel. The wake wireless channel is selected using a unique identifier of the node. Additionally, the operations include establishing a communication link with the diagnostic tool on a communication channel different from the wake wireless channel and performing a diagnostic operation with the diagnostic tool over the communication channel.

In an additional example, a non-transitory computer-readable medium having instructions stored thereon is provided. The instructions are executable by a processing device to perform operations including controlling a low-power endpoint to enter a sleep mode and controlling the low-power endpoint to enter a wake mode to listen for a wake signal from a diagnostic tool. The operations further include receiving the wake signal at the low-power endpoint from the diagnostic tool on a wake wireless channel. The wake wireless channel is determined from a unique identifier of the low-power endpoint. Additionally, the operations include controlling the low-power endpoint to establish a communication link between the low-power endpoint and the diagnostic tool on a communication channel different from the wake wireless channel. Further, the operations include controlling the low-power endpoint to perform a diagnostic operation with the diagnostic tool over the communication channel.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE DRAWINGS

Aspects and features of the various examples will be more apparent by describing examples with reference to the accompanying drawings, in which.

DETAILED DESCRIPTION

While certain examples are described herein, these examples are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Certain aspects and examples of the disclosure relate to systems and methods used to communicate with battery-operated endpoints (BEPs). The BEPs may be components of a mesh network associated with resource metering. In such an example, the BEPs may be used to provide resource metering information or BEP status information to other devices in the mesh network, such as additional metering endpoints or a head-end system of the mesh network.

A point to point communication technique may be implemented by a technician to perform diagnostic services on a BEP. For example, the point to point communication technique may be used by the technician to communicatively link a diagnostic communication tool with the BEPs without relying on a magnet busting operation. By avoiding the magnet busting operation, the BEPs can save battery power, and the life of batteries that power the BEPs may be extended. Additionally, the point to point communication technique may avoid a requirement that a technician be in close physical proximity with the BEPs.

In an example, an external software application (e.g., a diagnostic or field application) running on a diagnostic tool can receive an authentication from a central system (e.g., a head-end system for an advanced metering infrastructure (AMI)). A user of the diagnostic tool initiates a connection between a device running the external software application and a local radio (e.g., a communications adapter). The communications adapter provides the ability to transmit data to and receive data from the BEPs.

In operation, the communications adapter sends a connect command (e.g., a wakeup message) to a battery-operated endpoint using specific frequency channel based on a unique identifier of the battery-operated endpoint (e.g., a serial number or LAN ID). The battery-operated endpoint periodically listens for wakeup messages from a parent endpoint or another device. In an example, the battery-operated endpoint listens for the wakeup messages on the specific frequency channel based on the unique identifier of the battery-operated endpoint. When the battery-operated endpoint receives the connect command, the battery-operated endpoint provides an indication to the communications adapter that the connect command was received.

When a response is received from the battery-operated endpoint at the communications adapter, the diagnostic tool running the external software application can communicatively connect to the battery-operated endpoint through the communications adapter. This connection can occur upon completion of an authentication process that verifies that the device running the external software application is authorized to access restricted electronic data of the battery-operated endpoint. Upon completion of the connection, the diagnostic tool, using the external software application, can begin a diagnostic process associated with a radio operation of the battery-operated endpoint, associated with a metrology device in communication with the battery-operated endpoint, or a combination thereof.

The described examples provide a point to point communication technique that enables communication between a diagnostic device and a battery-operated endpoint. While the point to point communication technique is discussed generally for use with a battery-operated endpoint providing resource metering functions, it is by no means so limited. Rather, examples of the point to point communication technique may be used with low-power devices of any type or otherwise as desired. For example, the point to point communication technique may be used with any low-power endpoint such as a battery-operated endpoint, an endpoint with limited access to a power source, or an endpoint that is not connected to mains power.

Figure 1:
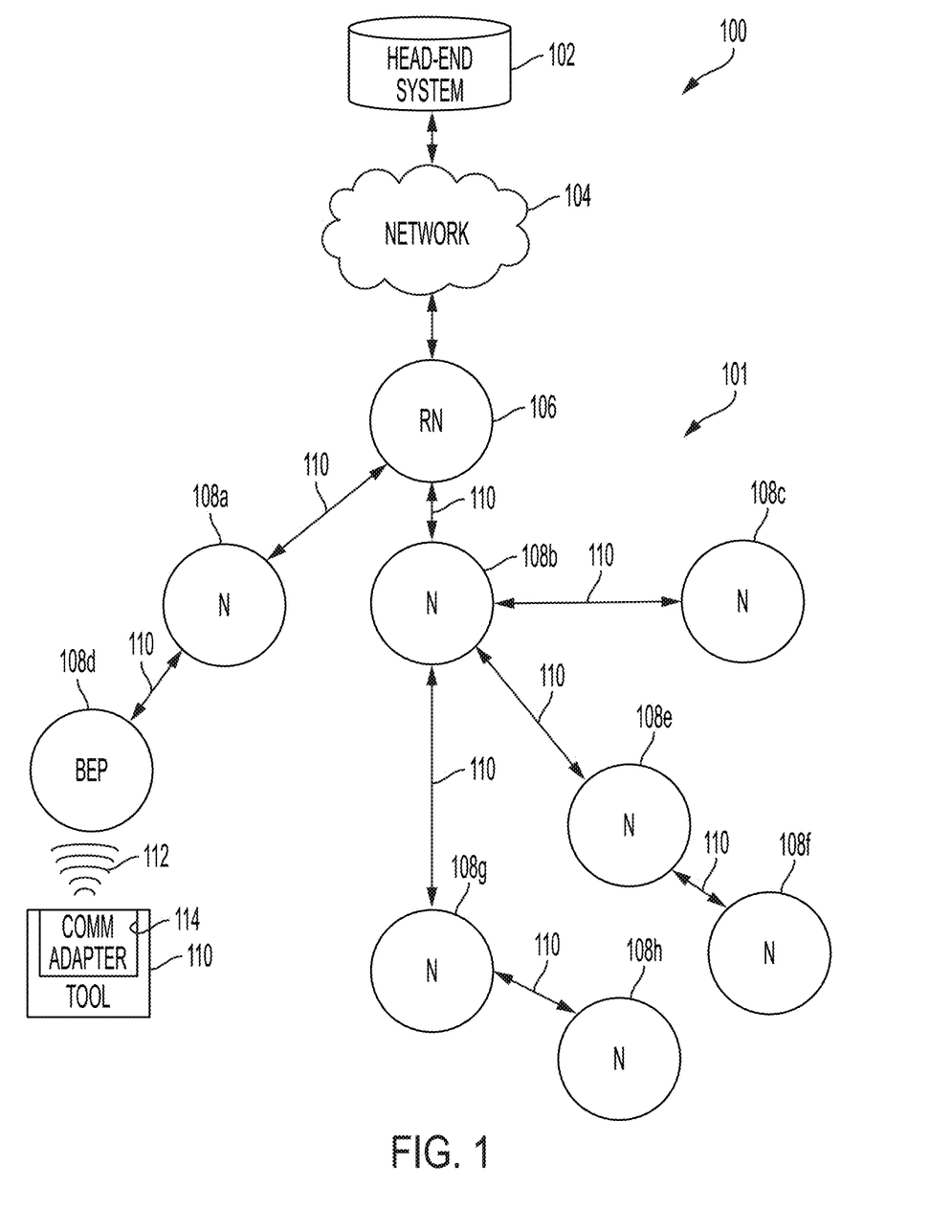
FIG. 1 is a block diagram of a networked system and a mesh network of smart devices, in accordance with one or more examples.

FIG. 1 is a block diagram illustrating an example of a networked system 100 and a mesh network 101. The networked system 100 and the mesh network 101 provide a network infrastructure for smart devices (e.g., resource consumption meters, vehicles, home appliances, etc. that include communication technology) to communicate across a network of nodes (i.e., other smart devices), the internet, and/or an intranet. The networked system 100 includes a head-end system 102, which may function as a central processing system that receives a stream of data from a network 104. The network 104 may be the internet, an intranet, or any other data communication network. The mesh network 101 may include a root node 106 and other nodes 108a-108h that collect data associated with the nodes 106 and 108a-108h, and the root node 106 transmits the collected data to the network 104 and ultimately to the head-end system 102 of the networked system 100. The root node 106 may be a personal area network (PAN) coordinator, an internet gateway, or any other device capable of connecting to the network 104.

The root node 106 may generally be referred to as a parent node due to data links with the nodes 108a and 108b that are located at a node layer (e.g., layer one) below the root node 106. For example, the root node 106 is illustrated as communicating directly with the network 104. As illustrated, nodes 108a and 108b may also be referred to as parent nodes due to data links with nodes 108c, 108d, 108e, and 108g that are located at a node layer (e.g., layer two) below the nodes 108a and 108b. Further, nodes 108e and 108g may be referred to as parent nodes due to data links with nodes 108f and 108h that are located at a node layer (e.g., layer three) below the nodes 108e and 108g. The nodes 108a-108h may all funnel information up through the node layers to the root node 106 and ultimately to the head-end system 102.

In operation, fewer or more nodes 108 may be included in the mesh network 101, and more root nodes 106 may also be included in the networked system 100. Additionally, while the mesh network 101 depicted in FIG. 1 includes a root node layer (i.e., the root node 106), layer one (i.e., the nodes 108a and 108b), layer two (i.e., the nodes 108c, 108d, 108e, and 108g), and layer three (i.e., the nodes 108f and 108h), fewer or more node layers are also contemplated. Moreover, while FIG. 1 depicts a specific network topology (e.g., a DODAG tree topology), other network topologies are also possible (e.g., a ring topology, a mesh topology, a star topology, etc.).

The head-end system 102 may keep track of operational and non-operational nodes 106 and 108a-108h. To track the status of the nodes 106 and 108a-108h, the nodes 106 and 108a-108h may track regular communications between the nodes 106 and 108a-108h, and report any interrupted communications up through the mesh network 101 to the head-end system 102. The reported communications may indicate to the head-end system 102 that one or more of the nodes 106 and 108a-108h are no longer operational. Other techniques may also be used to track operational statuses of the nodes 106 and 108a-108h.

When the head-end system 102 receives an indication of one or more non-operational nodes 106 and 108a-108h, the head-end system 102 may inform a technician of the issue and instruct the technician to conduct diagnostics on the non-operational nodes 106 and 108a-108h. In another example, the technician may be deployed to conduct routine preventative diagnostics on the nodes 106 and 108a-108h regardless of the operational status. For example, the technician may be deployed to diagnose, repair, or replace the nodes 106 and 108a-108h identified as being in outage or identified for routine maintenance. As used herein, the nodes 106 and 108a-108h may be considered "in outage" when the nodes 106 and 108a-108h are not meeting one or more designated performance thresholds. In an example, a designated performance threshold may include a lack of detected communication from a particular node 106 or 108a-108h for a designated amount of time. In another example, a designated performance threshold may include quality of metrology data received from the particular node 106 or 108a-108h.

The technician may receive an indication that the node 108d is either non-operational or is scheduled for routine maintenance. The node 108d, as illustrated, is a battery-operated endpoint. Because the node 108d is a battery-operated endpoint, the node 108d transitions into and out of a sleep state during normal operation to save battery power. To wake the node 108d from a sleep state to perform diagnostics on the node 108d, a diagnostic tool 110 may transmit a wake signal 112 using a communications adapter 114. The wake signal 112 may be a specific frequency or channel based on the a serial number, LAN ID, or other identification source of the node 108d. For example, when a LAN ID of the node 108d is AABBCCDD, a last byte or final bytes of the LAN ID may be used to determine a wakeup channel or frequency for the node 108d. The wakeup channel or frequency for the node 108d may be a channel or frequency that is not used on the mesh network 101. Upon receiving the wake signal 112 at the wakeup channel or frequency, the node 108d may wake up from the sleep mode.

In an example, the node 108d may wake from a sleep mode at set intervals to listen for standard communications from other nodes (e.g., the node 108a). The node 108d may also listen at set intervals for the wake signal 112. In an example, the set intervals for listening for the wake signal 112 are less frequent than the standard communication intervals. Once the wake signal 112 is received, then a communication link between the diagnostic tool 110 and the node 108d may be established, as described in more detail below with respect to FIGS. 2 and 3.

Because the diagnostic tool 110 provides the wake signal 112 to the node 108d as a wireless signal, only the communications adapter 114 needs to be within wireless range of the node 108d. In some examples, the communications adapter 114 may be a wireless communication device in communication with the internet at a premises of the node 108d, and the diagnostic tool 110 may be a computing device also in communication with the internet such that the diagnostic tool 110 has access to control the communications adapter 114. In such an example, the diagnostic tool 110 may be located remotely from the communications adapter 114. In other examples, the diagnostic tool 110 and the communications adapter 114 may be integrated into a single device for use by a technician at the premises of the node 108d.

Figure 2:
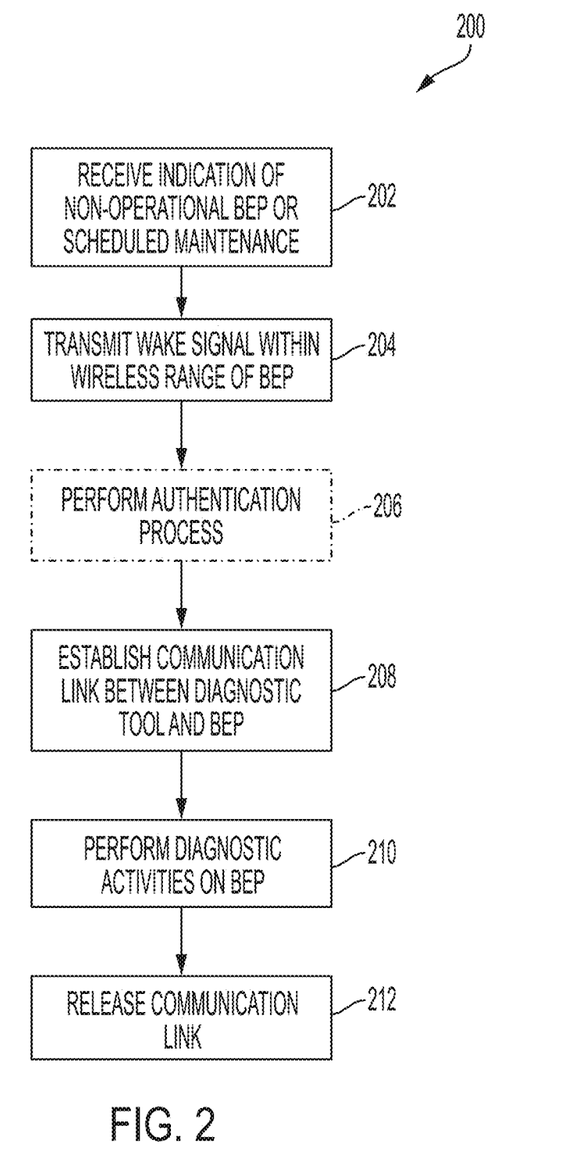
FIG. 2 is a flowchart of a process for establishing a point to point communication link between a diagnostic tool 110 and a battery-operated endpoint, in accordance with one or more examples.

FIG. 2 is a flowchart of a process 200 for establishing a point to point communication link between the diagnostic tool 110 and a battery-operated endpoint such as the node 108d. At block 202, the process 200 involves receiving an indication of a non-operational battery-operated endpoint, such as the node 108d, or receiving an indication of a scheduled maintenance of a battery-operated endpoint. Upon receiving the indication of the non-operational battery-operated endpoint or the indication of scheduled maintenance, a technician may be dispatched to the premises of the battery-operated endpoint.

At block 204, the process 200 involves transmitting the wake signal 112 from the communications adapter 114 within a wireless range of the battery-operated endpoint. Because the battery-operated endpoint wakes periodically to check for the wake signal 112, the communications adapter may send a constant signal during a set time period to ensure that the wake signal 112 is transmitted during one or more of the wake periods of the battery-operated endpoint. In an example where the battery-operated endpoint listens for the wake signal 112 for a brief period of time every five seconds, the communications adapter 114 may transmit the wake signal 112 for more than five seconds to ensure that the battery-operated endpoint will receive the wake signal 112.

At block 206, the process 200 involves performing an authentication process to authenticate the wake signal 112. In some examples, the authentication process may be an optional step to ensure that the diagnostic tool 110 is a device approved for communication with the battery-operated endpoint. For example, the diagnostic tool 110 may provide the battery-operated endpoint with a mobile authentication token (MAT) through the communications adapter 114, and the battery-operated endpoint can respond with a message that the MAT is accepted and that a secure connection has been established.

At block 208, the process 200 involves establishing a communication link between the diagnostic tool 110 and the battery-operated endpoint. In an example, establishing a communication link may involve synchronizing communication channels between the battery-operated endpoint and the diagnostic tool 110. For example, the battery-operated endpoint may provide a message to the diagnostic tool 110 indicating a communication channel that should be used for further diagnostic communications. In some examples, the battery-operated endpoint and the diagnostic tool 110 may communicate using a frequency hopping pattern.

At block 210, the process 200 involves performing diagnostic activities on the battery-operated endpoint. The diagnostic activities may include diagnostic processes on a radio operation of the battery-operated endpoint, diagnostic processes on a metrology operation of the battery-operated endpoint, or a combination thereof. The diagnostic activities may provide information to a technician about systems of the battery-operated endpoint that are or are not functioning properly.

At block 212, the process 200 involves releasing the communication link upon completion of the diagnostic processes. When the communication link is released, the battery-operated endpoint may resume its standard sleep and wake pattern with the other nodes 108 of the mesh network 101. In one or more examples, generating the communication link between the diagnostic tool 110 and the battery-operated endpoint may involve removing the battery-operated endpoint from communication on the mesh network 101. Upon releasing the communication link after completion of a diagnostic operation, the battery-operated endpoint may rejoin the mesh network 101 to resume communication on the mesh network 101.

Figure 3A:
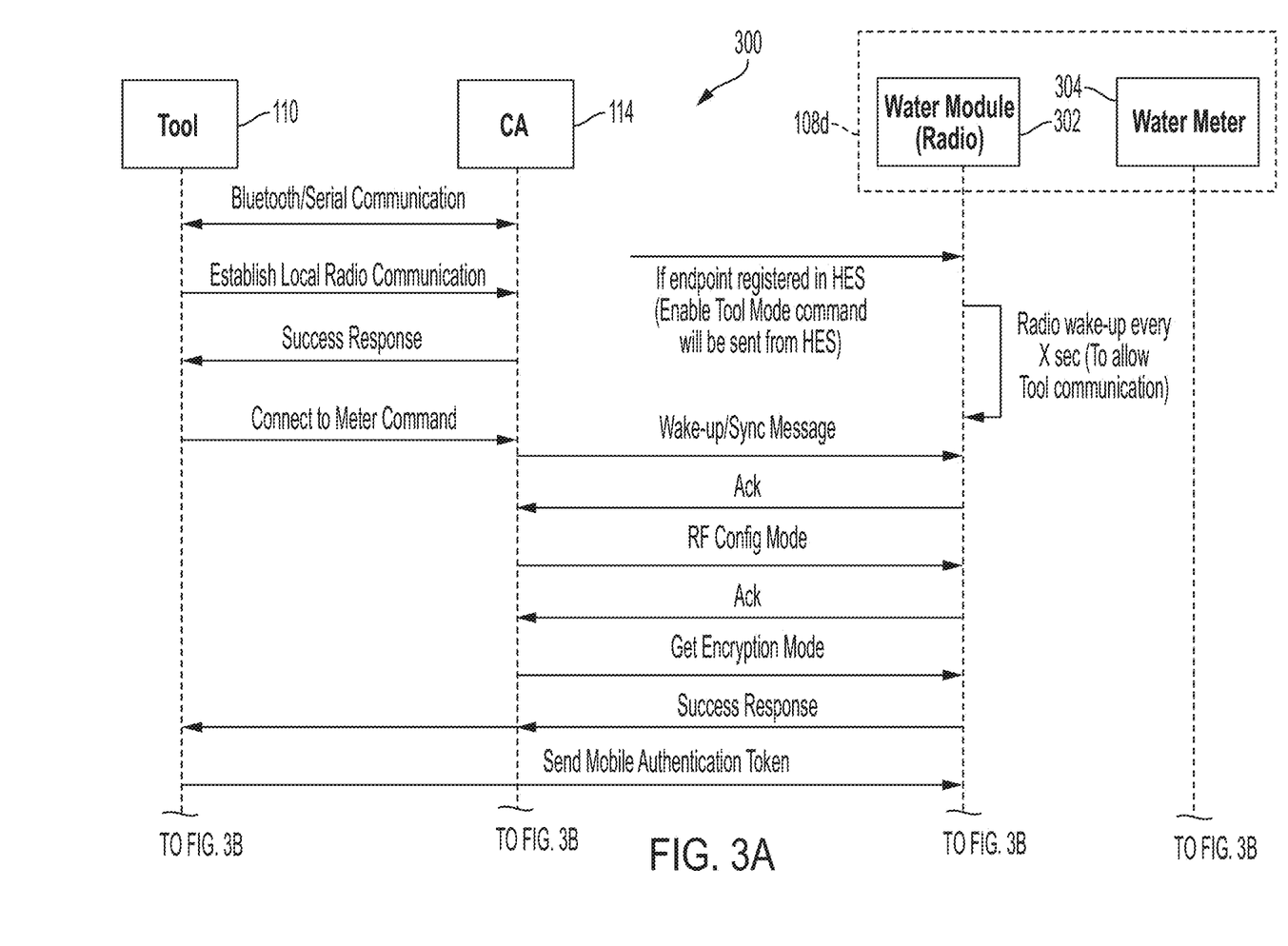
FIGS. 3A and 3B include an example of a workflow for establishing point to point communication between the battery-operated endpoint and a communication tool, in accordance with one or more examples.
Figure 3B:
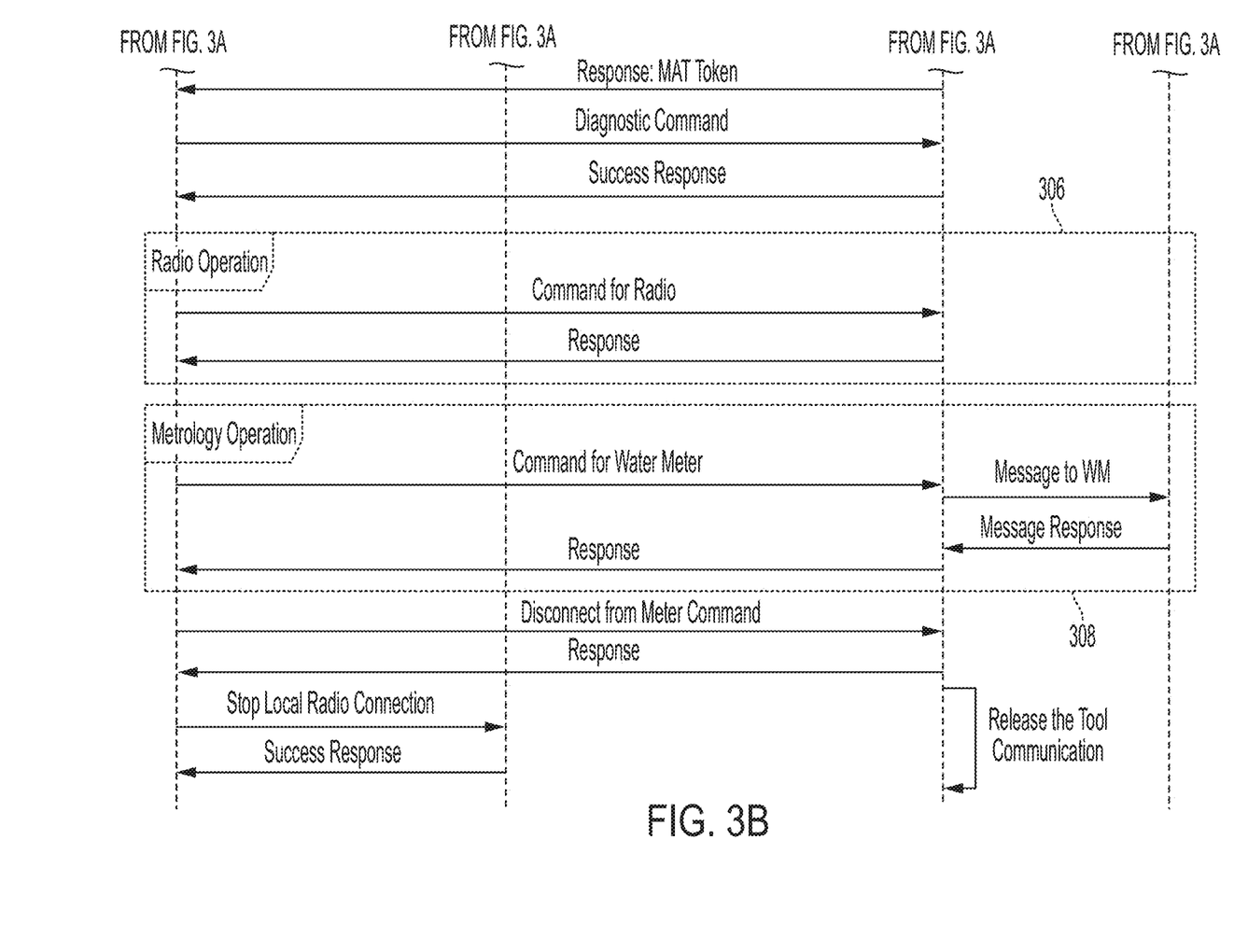

FIGS. 3A and 3B include an example of a workflow 300 for establishing the point to point communication between an external software application running on the diagnostic tool 110 and the node 108d (e.g., a low-power or battery-operated endpoint). By using the workflow 300, a technician is not required to be within a certain physical proximity of the node 108d. That is, the technician does not have to physically contact the node 108d. Further, excess power consumption resulting from the wakeup process associated with the magnet busting operation is avoided. In an example, the external software application running on the diagnostic tool 110 can establish a communication link with the node 108d using radio communication without first performing a magnet busting operation. In the example of FIG. 3, the node 108d is represented by a water communication module 302 (e.g., a radio) in communication with a water meter 304. Other metrology systems and devices, such as electrical metering systems, may also perform the point to point communication technique in a similar manner. In an example, the workflow 300 can be performed in the field to receive diagnostic information from a water module deployed at a customer premises, or the workflow 300 can be performed in a testing environment where the water module is not deployed to a metering location (e.g., deployed within a testing lab).

The workflow 300 can be used in an RF mesh environment or in an RF mesh IP environment. For illustrative purposes, the workflow 300 is depicted as an interaction between the diagnostic tool 110, which is running an external diagnostic software application, and the endpoint 108d that includes the water module 302 and the water meter 304. However, other software applications and endpoint configurations are also contemplated within the scope of the present disclosure. As shown in FIG. 3A, the endpoint 108d may initially register with the head-end system 102 such that the endpoint 108d is able to receive communications from the head-end system 102 across the mesh network 101. After successful registration with the head-end system 102, a wake and sleep cycle mode of the endpoint 108d may be disabled to save battery. To enable the wake and sleep cycle mode, the head-end system 102 may transmit an "Enable Tool Mode" command when the head-end system 102 receives an indication that a technician will be performing diagnostic operations on the endpoint 108d. The "Enable Tool Mode" command instructs the water module 302 to begin a wake and sleep cycle for a period of time when the technician is expected such that the endpoint 108d is able to listen for a wake signal from the communications adapter 114.

The diagnostic tool 110 communicates with the communications adapter 114 using a Bluetooth or serial communication link. Through the Bluetooth or serial communication link, the diagnostic tool 110 sends a message to the communications adapter 114 to initiate establishment of a communications adapter communication link. In response, the communications adapter 114 provides a success response. When the success response is returned to the diagnostic tool 110, the diagnostic tool 110 then provides an indication to the communications adapter 114 to establish a connection (e.g., a communications link) with the node 108d (e.g., through the water module 302 or other radio portion of the node 108d).

When the communications adapter 114 receives the indication from the diagnostic tool 110 to connect to the meter, the communications adapter 114 sends a wake-up message (e.g., the wake signal 112 of FIG. 1) to the water module 302. The wake-up message is transmitted at the frequency or channel associated with the unique identifier of the meter (e.g., the serial number or LAN ID). For example, the communications adapter 114 and the water module 302 may use a channel that corresponds to a low order byte of the LAN ID. To ensure that the wake-up message is transmitted while the water module 302 is in a periodically listening state for a limited time, the communications adapter may transmit the wake-up message for an amount of time that is sufficient to ensure that the water module 302 has cycled through at least one wake and sleep cycle. For example, if the water module 302 wakes every 5 seconds for 1 ms, then then communications adapter 114 may transmit the wake-up message for at least 10 seconds. When the water module 302 receives the wake-up message, the water module 302 exits a sleep mode and provides an acknowledgement to the communications adapter 114 that the wake-up message was received. Upon exiting the sleep mode, the water module may disconnect from any parent endpoints (e.g., the node 108a of FIG. 1) of the mesh network 101 in which the water module 302 was operating.

In response to the acknowledgement from the water module 302 that the wake-up message was received, the communications adapter 114 provides a radio frequency configuration message to the water module in the frequency or channel on which the wake-up message was sent. The radio frequency configuration message may establish a different channel across which the communications adapter 114 and the water module 302 can communicate. The water module 302 can either acknowledge the new channel, or the water module 302 can propose a different communication channel. This process may continue until a communication channel is agreed upon by the communications adapter 114 and the water module 302.

Other methods of establishing a communication link between the communications adapter 114 and the water module 302 are also contemplated. For example, the communications adapter 114 may conform with a frequency hopping pattern of the water module 302 to establish the communications link. When the water module 302 operates in a frequency hopping pattern, the communications adapter 114 may send RF configuration messages on a number of different frequency channels to identify the frequency hopping pattern of the water module 302. For example, the water module 302 may return an acknowledgement at a frequency channel on which the water module 302 currently operates. The communications adapter 114 may know the hopping pattern of the water module 302, and the communications adapter 114 may synchronize with that pattern based on the indication of the current frequency channel of the water module 302. In an example, the hopping pattern may be developed based on a module serial number, which is unique across the mesh network 101. A channel or frequency spectrum may be derived from hardware and firmware capability based on the country. For example, in the United States a 902-928 MHz RF spectrum is used.

When the communication channel between the communications adapter 114 and the water module 302 is established, the communications adapter 114 optionally provides a "get encryption mode" command to the node 108d to begin an authentication process between the diagnostic tool 110 and the node 108d when an authentication process is desired. In an example, upon receipt of an indication that the water module 302 acknowledged the get encryption mode command, the diagnostic tool 110 provides the water module 302 with a mobile authentication token (MAT) through the communications adapter 114. The MAT provides the water module 302 with an indication that the diagnostic tool 110 is authorized to access electronically restricted data of the water module 302. Turning to FIG. 3B, the water module 302 can respond with an indication that the MAT is accepted and that a secure connection was established.

Other types of workflows may also be used and may be based upon the type of communication used by the communications adapter 114 and the water module 302. The types of communications include, but are not limited to, RF mesh, RF Mesh IP, wireless smart utility network (Wi-SUN), and other standards based communications. In some implementations, the water module 302 wakes up and begins channel hopping. The channel hopping may be different than any channel hopping used for typical network communications (e.g., on the mesh network 101). In this implementation, the communications adapter 114 may send the wake-up message to the water module 302 on multiple channels, and the work flow may include determining one of the channels for communications between the communications adapter 114 and the water module 302.

Upon establishing a communications link, the diagnostic tool 110 can provide a diagnostic command to the water module 302 through the communications adapter 114. The diagnostic command includes a diagnostic request for radio parameter configurations of the water module 302. Upon receiving a successful response from the water module 302, the diagnostic tool 110 can begin a radio operation diagnostic process 306, a metrology operation diagnostic process 308, or both. The radio operation diagnostic process 306 may include performing a diagnostic operation on a radio of the water module 302 to ensure that the radio of the water module 302 is functioning properly or to identify any issues with how the radio of the water module 302 is operating. In an example, a radio operation diagnostic command is transmitted through the communications adapter 114 to the water module 302.

The metrology operation diagnostic process 308 may include performing a diagnostic operation on the water meter 304 associated with the water module 302 to ensure that the water meter 304 is functioning properly or to identify any issues with how the water meter 304 is operating. In an example, a metrology operation diagnostic command is transmitted through the communications adapter 114 to the water module 302. The water module then transmits a diagnostic message to the water meter 304, receives a response from the water meter 304, and transmits a diagnostic response to the diagnostic tool 110 through the communications adapter 114.

Upon completion of the diagnostic processes, the diagnostic tool 110 sends a command to the water module 302 to disconnect the communications link. The water module 302 confirms the disconnection with a response to the diagnostic tool 110 and attempts to reconnect with parent devices (e.g., the node 108a) in the mesh network 101. For example, the water module 302 may initiate a new joining process to generate a communication link with the mesh network 101. Upon receipt of the confirmation from the water module 302, the diagnostic tool 110 may send a message to the communications adapter 114 to disconnect the communications link between the diagnostic tool 110 and the communications adapter 114. The communications adapter 114 then confirms disconnection with a response to the diagnostic tool 110.

Figure 4:
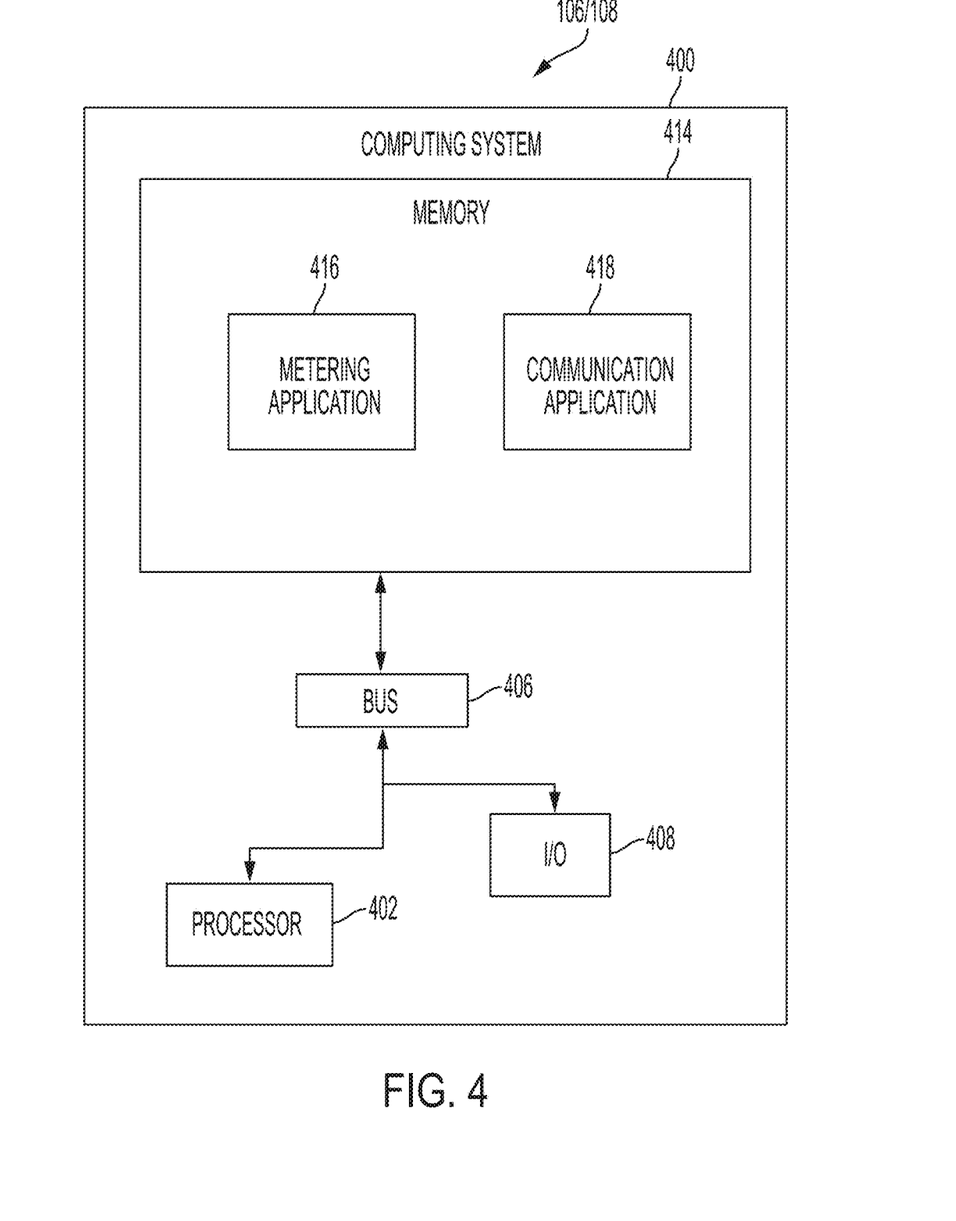
FIG. 4 is an example of a block diagram of a node of the networked system of FIG. 1, in accordance with one or more examples.

FIG. 4 is an example of a block diagram of components of a node 106 or 108 of the mesh network 101. Some or all of the components of a computing system 400 can belong to one or more of the nodes 106 or 108a-108h of FIG. 1. The computing system 400 includes one or more processors 402 communicatively coupled to one or more memory devices 414. The computing system 400 executes program code that configures the processor 402 to perform one or more of the operations described above with respect to FIGS. 1-3. For example, the memory devices 414 may include a metering application 416 (e.g., to control the water meter 304) and a communication application 418 (e.g., to control the water module 302). The program code of the metering application 416 and the communication application 418, which can be in the form of non-transitory computer-executable instructions, can be resident in the memory device 414 or any suitable computer-readable medium and can be executed by the processor 402. Execution of such program code configures or causes the processor(s) to perform the operations described herein with respect to the nodes 106 and 108a-108h. While FIG. 4 depicts the metering application 416 stored within the memory devices 414, other applications associated with other actions of the nodes 106 and 108a-108h may replace the metering application 416 or be added to the metering application 416 depending on the functionality of the nodes 106 and 108a-108h. Further, the communication application 418 may provide instructions for the nodes 106 and 108a-108h to implement multiple communication standards including an RF mesh or any other wired or wireless communication standards.

The computing system 400 may also include an input/output ("I/O") interface 408 that can receive input from input devices or provide output to output devices. The interface 408 may include RF antennas capable of transmitting and receiving RF communication from other nodes 106 or 108 in the mesh network 101 and from the diagnostic tool 110. The computing system 400 may also be able to communicate with one or more other computing devices or computer-readable data sources using the interface 408. Additionally, a bus 406 can also be included in the computing system 400. The bus 406 can communicatively couple one or more components of the computing system 400 and allow for communication between such components.

The subject matter of the presently disclosed examples is described herein with specificity to meet statutory requirements, but this description is not necessarily intended to limit the scope of the presently disclosed subject matter. The disclosed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The foregoing is provided for purposes of illustrating, explaining, and describing various examples. Having described these examples, it will be recognized by those of skill in the art that various modifications, alternative constructions, and equivalents may be used without departing from the spirit of what is disclosed. Different arrangements of the components depicted in the drawings or described above, as well as additional components and steps not shown or described, are possible. Certain features and subcombinations of features disclosed herein are useful and may be employed without reference to other features and subcombinations. Additionally, a number of well-known processes and elements have not been described in order to avoid unnecessarily obscuring the examples. Examples have been described for illustrative and not restrictive purposes, and alternative examples will become apparent to readers of this patent. Accordingly, examples are not limited to those described above or depicted in the drawings, and various modifications can be made without departing from the scope of the presently disclosed subject matter.

That which is claimed is:

1. A communication link establishment method, comprising:
   transmitting, by a diagnostic tool, a wireless wake signal on a wake wireless channel to a low-power endpoint in a metrology mesh network, wherein the wake wireless channel is selected using a unique identifier of the low-power endpoint;
   receiving, at the diagnostic tool, a confirmation message from the low-power endpoint that the wireless wake signal was received at the low-power endpoint;
   establishing, by the diagnostic tool, a communication link between the diagnostic tool and the low-power endpoint at a wireless communication channel different from the wake wireless channel; and
   performing, by the diagnostic tool, a diagnostic operation on the low-power endpoint.

2. The method of claim 1, further comprising:
   performing an authentication process between the low-power endpoint and the diagnostic tool to verify that the diagnostic tool has authorization to interact with the low-power endpoint.

3. The method of claim 1, wherein transmitting the wireless wake signal comprises transmitting the wireless wake signal for a transmission period that is longer than a wake and sleep cycle of the low-power endpoint.

4. The method of claim 1, wherein establishing the communication link between the diagnostic tool and the low-power endpoint at the wireless communication channel comprises synchronizing a frequency hopping pattern between the low-power endpoint and the diagnostic tool.

5. The method of claim 1, wherein the diagnostic operation comprises a radio diagnostic operation, a metrology diagnostic operation, or a combination thereof on the low-power endpoint.

6. The method of claim 1, further comprising:
   releasing the communications link between the low-power endpoint and the diagnostic tool upon completion of the diagnostic operation.

7. The method of claim 1, wherein the unique identifier of the low-power endpoint comprises a local area network identification (LAN ID) or a serial number of the low-power endpoint.

8. The method of claim 1, wherein the unique identifier of the low-power endpoint comprises a local area network identification (LAN ID), and wherein the wake wireless channel for the low-power endpoint is determined from a low order byte of the LAN ID.

9. The method of claim 1, wherein the communication link is established using radio frequency (RF) mesh, RF mesh internet protocol (IP), or wireless smart utility network (Wi-SUN) standards.

10. A node of a networked system, comprising: a processor configured to execute non-transitory computer-readable instructions; a memory configured to store the computer-readable instructions that, when executed by the processor, cause the processor to perform operations comprising: entering a sleep mode; entering a wake mode to listen for a wake signal from a diagnostic tool; while in the wake mode, receiving the wake signal from the diagnostic tool on a wake wireless channel, wherein the wake wireless channel is selected using a unique identifier of the node; establishing a communication link with the diagnostic tool on a communication channel different from the wake wireless channel; and performing a diagnostic operation with the diagnostic tool over the communication channel.

11. The node of claim 10, wherein the instructions further cause the processor to perform operations comprising:
    performing an authentication process with the diagnostic tool to verify that the diagnostic tool has authorization to interact with the node.

12. The node of claim 11, wherein performing the authentication process comprises receiving a mobile authentication token from the diagnostic tool.

13. The node of claim 10, wherein the diagnostic operation comprises a radio diagnostic operation, a metrology diagnostic operation, or a combination thereof on the node.

14. The node of claim 10, further comprising:
    a radio configured to communicate with the diagnostic tool;
    a metrology device in communication with the radio; and
    a battery configured to provide power to the processor, the memory, the radio, and the metrology device.

15. The node of claim 14, wherein the metrology device is configured to meter consumption of electricity, water, or natural gas.

16. A non-transitory computer-readable medium having instructions stored thereon, the instructions executable by a processing device to perform operations comprising:
    controlling a low-power endpoint to enter a sleep mode;
    controlling the low-power endpoint to enter a wake mode to listen for a wake signal from a diagnostic tool;
    receiving the wake signal at the low-power endpoint from the diagnostic tool on a wake wireless channel, wherein the wake wireless channel is determined from a unique identifier of the low-power endpoint;
    controlling the low-power endpoint to establish a communication link between the low-power endpoint and the diagnostic tool on a communication channel different from the wake wireless channel; and
    controlling the low-power endpoint to perform a diagnostic operation with the diagnostic tool over the communication channel.

17. The non-transitory computer-readable medium of claim 16, wherein the instructions are further executable by the processing device to perform operations comprising:
    performing an authentication process with the diagnostic tool to verify that the diagnostic tool has authorization to interact with the low-power endpoint.

18. The non-transitory computer-readable medium of claim 16, wherein the unique identifier of the low-power endpoint comprises a local area network identification (LAN ID) or a serial number of the low-power endpoint.

19. The non-transitory computer-readable medium of claim 16, wherein the wake mode to listen for the wake signal from the diagnostic tool is different from a communication wake mode of the low-power endpoint for communicating on a mesh network.

20. The non-transitory computer-readable medium of claim 16, wherein the communication link is established using radio frequency (RF) mesh, RF mesh internet protocol (IP), or wireless smart utility network (Wi-SUN) standards.

* * * * *